(12) United States Patent
Smith et al.

(10) Patent No.: US 7,640,797 B2
(45) Date of Patent: Jan. 5, 2010

(54) METHOD AND SYSTEM FOR INCREASING SAFETY IN CHEMICAL APPLICATION FROM AN AIRCRAFT

(75) Inventors: David Bernard Smith, Starkville, MS (US); James Bert Nail, Starkville, MS (US)

(73) Assignee: Mississippi State University, Mississippi State, MS (US)

( * ) Notice: Subject to any disclaimer, the term of this patent is extended or adjusted under 35 U.S.C. 154(b) by 699 days.

(21) Appl. No.: 11/373,820

(22) Filed: Mar. 10, 2006

(65) Prior Publication Data

US 2007/0145191 A1 Jun. 28, 2007

Related U.S. Application Data

(60) Provisional application No. 60/662,595, filed on Mar. 17, 2005.

(51) Int. Cl.
*A63B 53/00* (2006.01)
*G01W 1/00* (2006.01)
(52) U.S. Cl. ............... 73/170.02; 73/170.01; 73/170.07
(58) Field of Classification Search .............. 73/170.01, 73/170.02, 170.07
See application file for complete search history.

(56) References Cited

U.S. PATENT DOCUMENTS

| | | | | |
|---|---|---|---|---|
| 5,025,988 A | * | 6/1991 | Lund ......................... | 239/171 |
| 5,091,871 A | * | 2/1992 | Arethens ..................... | 701/14 |
| 5,546,799 A | * | 8/1996 | Parker ....................... | 73/170.11 |
| 6,424,295 B1 | * | 7/2002 | Lange ................... | 342/357.13 |
| 6,669,105 B2 | * | 12/2003 | Bryan et al. .................. | 239/61 |
| 6,686,878 B1 | * | 2/2004 | Lange ................... | 342/357.13 |
| 6,799,740 B2 | * | 10/2004 | Heller et al. ................. | 244/136 |
| 6,926,211 B2 | * | 8/2005 | Bryan et al. ................ | 239/311 |

\* cited by examiner

*Primary Examiner*—Andre J Allen
(74) *Attorney, Agent, or Firm*—Lawrence Arthur Schemmel

(57) ABSTRACT

This invention relates to a method and system for increasing safety in chemical application from an aircraft. Wind speed, wind direction and other critical flight parameters are measured, calculated, recorded, and visually or audibly announced during the aircraft flight via onboard equipment, which parameters provide a means for the aircraft pilot to control chemical spray application and for unassisted automatic chemical spray cutoff and for limiting spray application outside an application zone or target area. Such parameters also provide a means for indicating the lift reserve of the aircraft and a means for determining atmospheric stability near the ground and providing the pilot with a record of the meteorological conditions at a particular location. The method and system of the present invention also provide a means for predicting appropriate aircraft upwind offset distance to compensate for predicted chemical spray drift.

10 Claims, 4 Drawing Sheets

METHOD AND SYSTEM FOR INCREASING SAFETY IN CHEMICAL APPLICATION FROM AN AIRCRAFT

CROSS-REFERENCE TO RELATED APPLICATION

This application is a regular National application claiming priority from Provisional Application, U.S. Application Ser. No. 60/662,595 filed Mar. 17, 2005. The entirety of that provisional application is incorporated herein by reference.

FIELD OF THE INVENTION

The invention relates to a novel method and system for increasing safety in chemical application from an aircraft, specifically the safety of individuals and property on the ground. More specifically, the invention relates to a novel method for determining, measuring, and recording wind speed, wind direction, and atmospheric stability during an aircraft flight and for predicting appropriate aircraft upwind offset distance for the pilot to compensate for spray drift based on software modeling of such spray drift, trajectory of spray droplets, and where the spray will settle. The invention provides a method for predicting where the aircraft should optimally be located for a given spray result and the best flight path to follow for a given flight height, wind speed, and wind direction for the spray to hit the intended target, thereby limiting spray application outside an application zone or target area. The invention also provides a means for indicating the lift reserve of the aircraft and thereby providing a means for aircraft pilot unassisted automatic chemical spray cutoff for controlling spray application. The wind speed and wind direction measurements are relevant at aircraft flight height, while the atmospheric stability measurement is relevant for an application zone near the ground.

BACKGROUND OF THE INVENTION

The inability to control chemical spray drift and the misapplication of chemicals caused by spray drift is an ongoing concern, especially when applying such products from the air by means of aircraft. Such lack of control and spray drift removes some of the chemicals from the intended target(s) and deposits them in or on unplanned or undesirable locations or targets. Off-target chemical spray drift deposits can temporarily or permanently injure or damage individuals, susceptible vegetation, wildlife, air and water supplies, and other similar recipients. Although such chemical spray drift may not be completely eliminated, the use of proper equipment and application techniques may minimize unplanned or undesirable chemical spray drift deposits.

In contrast to the desirability of eliminating or minimizing certain chemical spray drift, for row crop spraying for example, applying mosquito insecticides requires controlled drift spraying. Particularly in the case of mosquito control, the need to measure and evaluate wind speed and wind direction at a particular reference level or application height is critical for controlling spray drift (allowing drift to occur in a controlled manner) and thereby increasing safety in such chemical application from an aircraft. Similarly, it is also important to know what the stability of the atmosphere is for the given location. The ability to predict aircraft upwind offset distance based on spray drift modeling and the boundaries of where the spray will settle is desirable for an efficient and successful aerial chemical application.

Determining critical parameters of wind speed and wind direction at various reference levels or flight application heights is required in controlling and in eliminating or minimizing chemical spray drift deposits, in recording meteorological and flight conditions at a particular location, and in predicting spray drift. Reference levels or chemical application heights vary with particular applications. For example, a nominal ground level or near ground level chemical application height for row crop chemical spraying is typically about 10 to 20 feet above ground level. Forest application requires a nominal chemical application height of about 70 to 100 feet above ground level. Insecticide application, such as mosquito control, requires a nominal chemical application height of about 150 to 500 feet above ground level. Such information also provides the aircraft pilot the data needed to determine how and whether to apply spray chemicals based on application guidelines or labeling requirements governing such spray applications. Knowledge of such parameters is critical at each reference level in order to specifically and effectively control and predict chemical spray drift applied from the air.

Previous approaches exist that attempt to control off-target chemical spray drift. Additionally, several devices have been developed to determine, measure, indicate, and/or display aircraft air speed, the effects of crosswinds on a vehicle, the mean wind speed with respect to the ground of an aircraft, the ground speed of an aircraft, and the difference between air speed and ground speed of a motor vehicle, by the art disclosed in U.S. Pat. No. 5,546,799. This patent provides for a device for monitoring the draft created by a lead vehicle so that a trailing vehicle can be kept at an optimal distance from the lead vehicle to maximize gas or fuel mileage by measuring and displaying the difference between the air speed and ground speed of such motor vehicle to determine headwind or tailwind magnitudes.

Another method (U.S. Pat. No. 5,091,871) provides for determining the speed of the mean wind with respect to the ground during the flight period of an aircraft. Another method (U.S. Pat. No. 5,025,988) provides an aircraft spray distribution system including a nozzle design that does not mist the spray and cause off-target drift. Other methods (U.S. Pat. Nos. 6,669,105 and 6,926,211) provide for a mobile, ground-based, closed-loop system for delivering insecticide spray that focus on regulation of insecticide particle size and of amounts of insecticide sprayed. Another method (U.S. Pat. No. 6,799,740) provides for a system for controlling and effecting an appropriate or effective application or distribution of chemicals from an aircraft onto a ground target based on weather parameters at ground level and at aircraft level. In this patent ('740), the application equipment must be near the site of such parameter measurement to obtain valid reliability. Additionally, such ground-based equipment provides parameters that are only valid for relatively short spatial distances. Finally, parameter calculations based on measurements at a single-point-in-time-based system, as in this patent ('740), can be misleading, particularly under variable wind conditions. These devices and methods and the devices and methods referenced therein may not necessarily provide accurate or reliable wind speed and wind direction parameters under certain conditions during an aircraft flight. The present invention provides high reliability of critical parameter measurement since its measurement equipment is always on board the aircraft and its method uses no ground-based instrumentation. The present invention obtains its measurements over a reasonable time span and processes its data simultaneously to minimize the sum of the errors squared. Further, the other devices and methods do not also necessarily provide a means for measuring the lift reserve of an aircraft or a means for determining or recording accurate atmospheric stability or instability for a given spatial location as does the present invention. More importantly, those devices and methods do not provide such critical information for providing an aircraft pilot the ability to specifically predict the behavior of spray drift or to specifically minimize chemical spray drift, to predict spray drift or trajectory, to predict aircraft upwind offset distance and flight path, or to allow automatic chemical spray cutoff and likewise do not involve resultant methods of increasing safety in airborne chemical application as does the present invention.

Although known methods exist to determine moving vehicle air and ground speeds and to distribute chemicals from the air, it remains a significant goal of those skilled in the art to devise a simple method and system to specifically control chemical spray drift application from the air, to limit such chemical spray application outside a desired application zone, to allow automatic spray cutoff, to predict spray drift behavior, to predict aircraft upwind offset distance and flight path, and to thereby increase safety in such chemical application from an aircraft. The present inventors have designed a method and system for these purposes.

SUMMARY OF THE INVENTION

It is an object of the present invention to provide a method and system that can be implemented for increasing safety in chemical application from an aircraft.

It is another object of the present invention to provide a method and system for measuring and recording critical environmental parameters such as wind speed and wind direction during an aircraft flight and thereby provide a means for aircraft pilot control of chemical spray drift onto an application zone or target area.

It is yet another object of the present invention to provide a method and system for detecting pull-up in row crop spray application and thereby provide a means for pilot unassisted automatic chemical spray cutoff, further limiting the possibility of unintentional application outside an application zone or target area.

It is another object of the present invention to provide a method and system for predicting aircraft upwind offset distance to compensate for spray drift for a given flight height, wind speed, and wind direction.

It is another object of the present invention to provide a method and system for providing a means for indicating the lift reserve of the aircraft.

It is yet another object of the present invention to provide a method and system for providing a means for determining, measuring, and recording atmospheric stability near the ground.

With the foregoing and other objects, features, and advantages of the present invention that will become apparent hereinafter, the nature of the invention may be more clearly understood by reference to the following detailed description of the preferred embodiments of the invention and to the appended claims.

DESCRIPTION OF THE PREFERRED EMBODIMENTS

Figure 1:
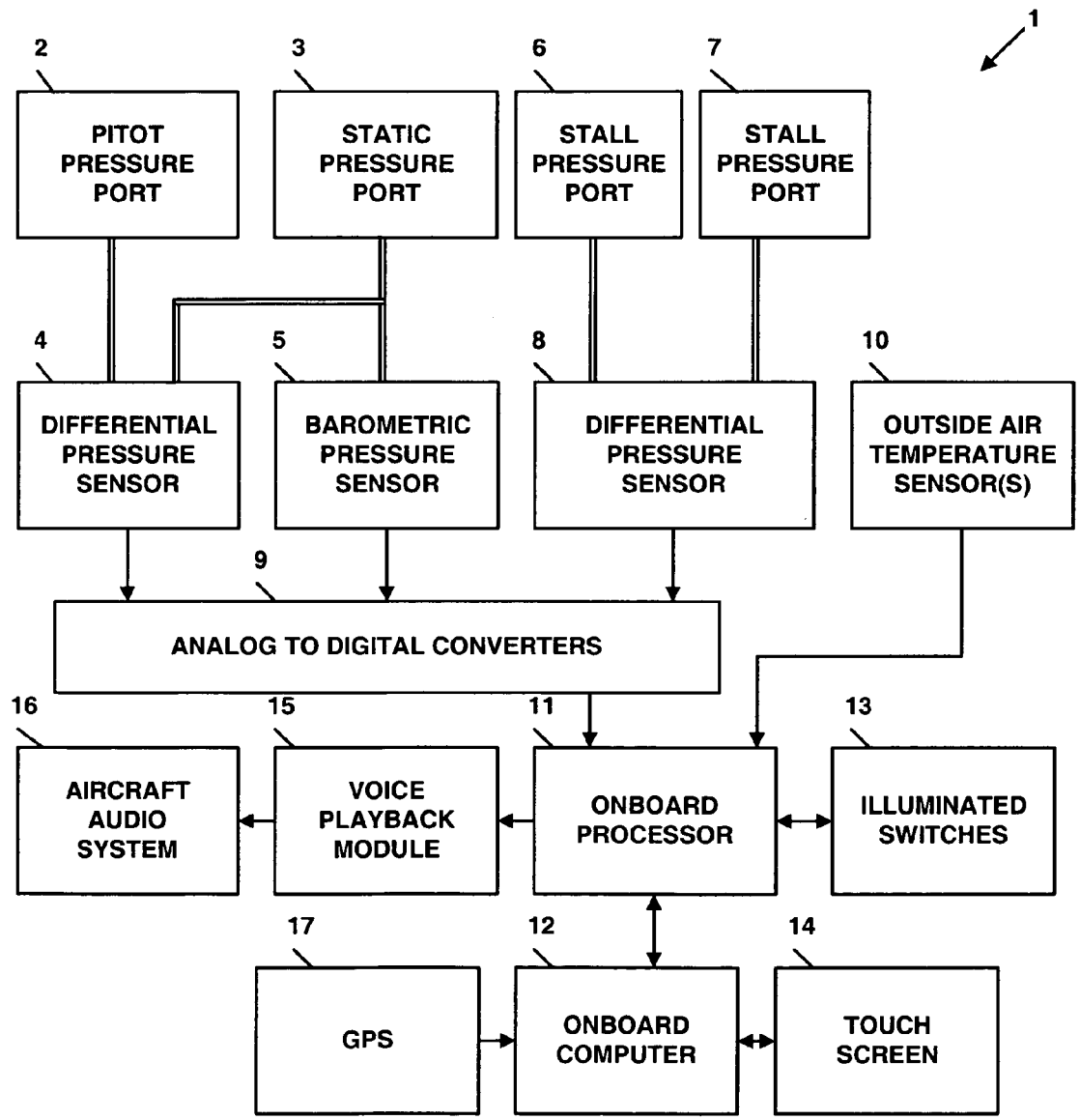
FIG. 1 is a graphical illustration of the functional block diagram showing the configuration of the components of the measurement system.

The method and system of the present invention makes it possible to increase and improve safety in chemical application from an aircraft by determining wind speed and wind direction during an aircraft flight, thereby providing spray control and automatic chemical spray cutoff and eliminating or limiting unplanned or undesirable chemical spray drift deposits. Additional objects and advantages of the invention provide a means to predict aircraft upwind offset distance to compensate for chemical spray drift based on software modeling of spray drift. Additional objects and advantages of the present invention serve to provide a means to measure lift reserve of the aircraft and to determine atmospheric stability or instability near the ground. It will be understood by those skilled in the art that the present invention is not limited in its application to the details of the arrangement described herein since it is capable of other embodiments and modifications. Moreover, the terminology used herein is for the purpose of such description and not of limitation.

The present invention provides a simple, immediate, efficient, and accurate determination of critical parameters of wind speed and wind direction at a particular reference level or chemical application height, which elevation above ground level varies with particular applications. Field application refers to row crop chemical spraying and requires a nominal reference level or chemical application height of about 10 to 20 feet above ground level. This reference level represents the height of a typical weather station routinely used to measure wind speed and wind direction at airports and other reference locations, which also approximates the typical chemical application height for application of herbicides, insecticides, fertilizers, and other chemicals to row crops in a field and for other purposes. Forest chemical spraying requires a nominal chemical application height of about 70 to 100 feet above ground level. Mosquito chemical spraying over towns and cities requires a nominal application height of about 150 to 500 feet above ground level. Wind speeds measured at elevations substantially greater than 10 to 20 feet may be corrected to the wind speed at a particular reference level or chemical application height if the stability of the atmosphere is known. The present invention also provides a measure of atmospheric stability and enables an aircraft pilot to record these parameters.

The method and system of the present invention in one preferred embodiment operates as a system for increasing safety in chemical application from an aircraft by measuring wind speed and wind direction during an aircraft flight and by controlling chemical spray drift and limiting spray application outside an application zone or target area. The system includes equipment to determine variables including, but not limited to, wind speed, wind direction, and atmospheric stability that are installed directly on an aircraft to provide data to the aircraft pilot at any time preceding, during, or after a given application. Determination of favorable and nonfavorable parameters for chemical spraying from an aircraft by the present invention results in increased safety.

In a preferred embodiment, the system of the present invention operates to predict aircraft upwind offset distance to compensate for chemical spray drift based on software modeling of spray drift and trajectory of spray droplets. The present invention provides a method to predict where the aircraft should fly for a given spray result and for a given droplet size distribution, spray composition, flight height, wind speed, and wind direction and based on other measured and calculated parameters. The aircraft upwind offset distance is defined as the horizontal distance between where the aircraft is located and the upwind edge of the next swath to be sprayed.

In a preferred embodiment, the system of the present invention operates to allow automatic chemical spray cutoff for controlling spray application for certain chemical applications. In a preferred embodiment, the system operates to provide a means for indicating the lift reserve of the aircraft. In a preferred embodiment, the system operates to provide a means for determining, measuring, and recording wind speed and wind direction at flight height and atmospheric stability near the ground.

The present invention first obtains airspeed by computing the square root of the ratio of pitot-to-static pressure and barometric pressure at flight altitude. This operation achieves an accuracy similar to the accuracy obtained by the airspeed instrument of the aircraft, which is not exceptional. Once a sufficient quantity of compatible data is obtained from two flights in opposing directions, the present invention minimizes the sum of the errors squared, which automatically computes a calibration constant (eliminating typical laborious calibration) and wind speed component in the same computation. The airspeed measurement may change due to an object hitting the pitot tube, but the method remains intact due to its self-calibrating nature and since it does not involve the pilot. Therefore, no special probes or laborious calibration is required. The method of the present invention utilizes data from the lowest altitude detectable with the barometric sensor for over-the-field parameter measurements. For higher applications, the invention also uses the barometric sensor and can select data from the same altitudes or use data from a climbing or gliding path and take into account the resulting decrease or increase in airspeed. The computational accuracy of the present invention provides a true reading of airspeed, which is used in computation of the spray rate.

The method of the present invention results in only one wind component being measured in each subcomputation. As an example, the airspeed calibration constant and an eastward wind component would result from data taken from an East flight pass and a West flight pass. All critical parameters can be obtained from additional flight passes taken in perpendicular or near perpendicular directions, thus yielding both wind speed and wind direction. Once the wind speed and wind direction are determined, spray passes for mosquito control, for example, are usually flown perpendicular to the wind direction. Each pair of these flight passes yields a wind component that is therefore zero, unless wind conditions begin to change. A spray pass is defined as a single traverse of an aircraft across an application zone or target area to be sprayed. The end of the spray pass is the end of a single traverse of the aircraft.

FIG. 1 shows a flow chart of the configuration of the components of the measurement system 1 for increasing safety in chemical application from an aircraft to an application zone or target area. The equipment of the system 1 includes a pitot tube pressure port 2 that measures static plus dynamic pressure and a static pressure port 3 that measures static pressure only, both of which are connected through tubing to a first differential pressure sensor 4. Static pressure port 3 is connected through similar tubing to a barometric pressure sensor 5. At least two stall pressure ports 6 and 7 are connected through similar plastic tubing to a second differential pressure sensor 8. The second differential pressure sensor 8 measures and indicates the differential air pressure in the stall pressure ports 6 and 7. The first differential pressure sensor 4, barometric pressure sensor 5, and second differential pressure sensor 8 are connected electrically to at least one analog-to-digital (A/D) converter 9. Sensors 4, 5, and 8 provide voltage outputs that are converted to digital formats by the A/D converter 9. The A/D converter 9 used can be one that employs a 3-wire, synchronous, serial interface or any of a number of A/D converters known in the art. At least one outside air temperature sensor 10 and the A/D converter 9 is connected to an onboard processor 11. The outside air temperature sensor 10 utilizes an I2C interface, which allows the sensor 10 to have an address in order to obtain data from more than one sensor 10 by using no more than two wires for communication. Differential temperature measurement can therefore be accomplished such that discrimination between sunny and cloudy weather conditions can occur, for example. The outside air temperature sensor 10 requires a minor aircraft airframe modification by placing the sensor 10 in the airstream and through an underwing or other airframe checkplate or at any location uninfluenced by engine exhaust or sunlight. Other common methods also exist to provide measurement and transmission of outside air temperature data. The temperature sensor 10 utilized in the present invention measures to $\frac{1}{32}$ degree Celsius resolution and has the I2C interface imbedded within the sensor 10.

The onboard processor 11 utilized in the present invention is a STAMP-2P40 microprocessor, but it will be understood that other processors known in the art may be used as well. The onboard processor 11 may be an application specific integrated circuit (ASIC), a processor or microprocessor, a BASIC STAMP® microcontroller or module (a registered trademark of Parallax, Inc.), a digital signal processor (DSP), or any other processing means or combinations thereof known in the art. The onboard computer 12 interfaces with the onboard processor 11 and manipulates information from the onboard processor 11 and performs efficient, accurate, and memory-intensive relevant computations. The present invention requires significant computational capacity, which is accomplished with the onboard computer 12 that stores and manages large qualities of data for both documentation of conditions over a sprayed area and for developmental research regarding multiple conditions observations including temperature profile observations, for example. The onboard computer 12 is capable of performing all necessary computations in the present invention. However, the present invention utilizes both onboard processor 11 and onboard computer 12 to capitalize on the benefits of both devices. Illuminated switches 13 consists of at least one illuminated switch having a light that allows ease of visibility to the aircraft pilot, important for daytime and nighttime chemical spraying application, but particularly important during nighttime chemical spraying application. The switches 13 provide enough light for the pilot to determine switch function but do not affect night vision. Light intensity can be controlled to indicate ongoing tasks and to confirm or signify that the pilot's request is being addressed. The onboard processor 11 communicates with the illuminated switches 13 for multiple purposes including blinking modes to indicate to the pilot that it is performing or calculating the pilot's request(s) for information. The onboard processor 11 also communicates with a voice playback module 15 for providing the pilot with relevant information of wind speed, wind direction, and chemical spray recommendations without diversion or dilution of the pilot's visual attention to the flight, an aspect important in all chemical spray applications and particularly in field applications. The voice playback module 15 utilized in the present invention provides the ability to store and recite numbers and key phrases that can be placed or strung together verbally under the control of the onboard computer 12. One example of such ability of verbal output via the voice playback module 15 would be: "The wind speed is" "four" "point" "three" "knots at" "one" "hundred" "forty" "two" "degrees." Audible voice playback of wind speed and wind direction to the pilot is particularly important for safety in over-the-field applications since the pilot's visual attention can remain undiluted. Other measurements that indicate changing parameters or conditions may also be announced to the pilot as well.

The voice playback module 15 communicates with the aircraft audio system 16. The output of the voice playback module is amplified as necessary to properly drive the aircraft audio system 16, similar to the resultant audio transmitted and received by, from, and between the pilot, copilot, or passenger(s) using typical audio microphones. The pilot in a chemical spray application may simply listen to the aircraft audio system 16 or may control it with illuminated switches 13 or touch screen 14 commands at the pilot's convenience or choice. The touch screen 14 provides information to the pilot that the illuminated switches 13 and the voice playback module 15 and audio also provide. The pilot can therefore obtain the information in one of two ways, thereby providing elements of both convenience and safety. A global positioning system (GPS) 17 consisting of an antenna and receiver communicates with the onboard computer 12. Information from GPS 17 may also be used for further atmospheric research. The onboard computer 12 receives real-time data from GPS 17 including, but not limited to latitude, longitude, time, date, altitude, and temperature. The onboard computer 12 also receives information from GPS 17 regarding ground speed and bearing, where the ground speed and bearing of the aircraft is the velocity at which the aircraft is traveling in relationship to the ground. The onboard computer 12 gathers and files other information from the onboard processor 11, processes relevant equations and computations to determine wind speed and wind direction, and further processes data and interpolating equations involving information including, but not limited to, droplet size distribution, flight height, temperature, relative humidity, wind speed, wind direction, aircraft type, and spray composition using software models, such as the AGDISP model, to provide the aircraft pilot with information including such parameters as offset distance, direction, and swath width. This and other information must be communicated to the pilot which, in the present invention, is presented to the pilot by the onboard computer 12 through data and graphics via the touch screen 14. The touch screen computer 12 also communicates with the onboard processor 11 so that the onboard processor 11 can inform the pilot audibly of any relevant information via the aircraft audio system 16.

The system 1 is relatively self-contained in that its processing equipment can be housed in either one or two enclosures and only requires access to aircraft electrical power, pitot and static lines, a co-pilot jack or similar device, a NEMA data stream from GPS 17, and a standard checkplate or similar device for imbedding the temperature sensor 10. Moreover, it allows obtaining statistics for generation of information on wind condition variability. The present invention provides the pilot with the ability to archive parameters including, but not limited to, latitude, longitude, time, date, temperature, and the variables measured and calculated for retrieval at a later date.

The system 1 provides enough flight data to be separated into subgroups, perform multiple non-iterative and concise computations, and extract the standard deviation. The flight data thus obtained allows for computation of such statistics and rates-of-change of wind conditions that are useful to the pilot.

Computation of Wind Speed and Wind Direction

Figure 2:
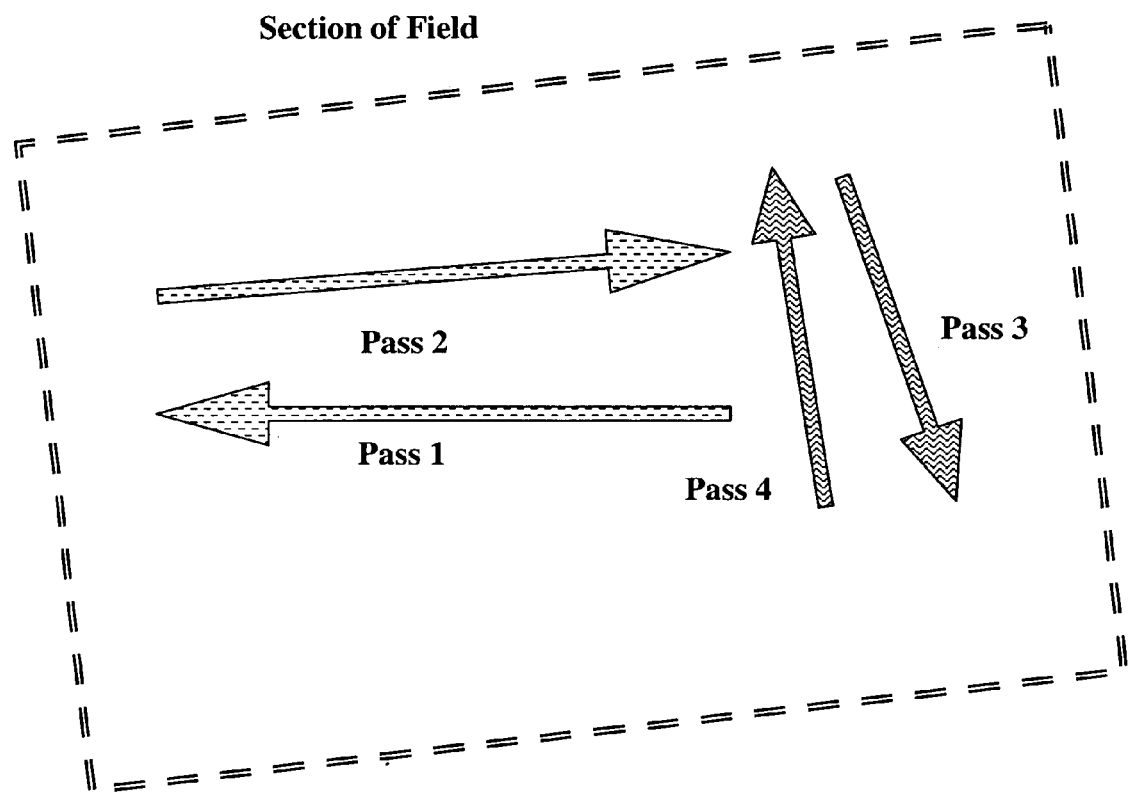
FIG. 2 is a graphical illustration of two pairs of test passes by an aircraft over sections of a field or application zone to collect data for determining wind speed and wind direction.

FIG. 2 is an illustration of two pairs of test flight passes made by an aircraft over a section of a field to collect wind speed and wind direction data. Wind speed and wind direction are calculated by gathering an equal number of measurements, m, while flying over a field or application zone to be sprayed in a test pattern comprising at least two flight passes at the same power setting and at the same altitude in opposing directions that are approximately parallel as shown in FIG. 2. For ease of visualization, these directions could be west and east or south and north, for example. Key variables are as follows:

| | |
|---|---|
| $G_n$ Ground speed while flying north | $G_s$ Ground speed while flying south |
| $G_e$ Ground speed while flying east | $G_w$ Ground speed while flying west |
| $V_n$ Airspeed while flying north | $V_s$ Airspeed while flying south |
| $V_e$ Airspeed while flying east | $V_w$ Airspeed while flying west |
| $B_n$ Bearing while flying north | $B_s$ Bearing while flying south |
| $B_e$ Bearing while flying east | $B_w$ Bearing while flying west |

At least two additional flight passes in opposing directions also approximately parallel and which are approximately perpendicular to the first two approximately parallel flight passes are also required. The latter two passes also consist of an equal number of measurements, p. It is not necessary for the test patterns to be on North/South or East/West bearings or precisely perpendicular to each other since the calculations will correct to true North coordinates. At least four total flight passes are to be made in a minimal period of time. The two sets of flight passes should be more than 45 degrees apart.

From such aircraft flights over the field or application zone, values of bearing and ground speed are obtained from the GPS 17. Values of airspeed are derived from the differential pressure sensor 4 and the barometric pressure sensor 5. The barometric pressure is also important as a relative indicator of altitude. These values comprise data sets which are saved in the onboard processor 11.

Only certain data in each data set can be used. Accordingly for field application, the most appropriate data sets are selected based on the highest sequential values of barometric pressure, which correlates to the lowest sequential altitudes attained during the test pattern conducted over the field or application zone. For mosquito application, a sequential group of values at relatively constant barometric pressure is selected. The data are further pared so that an equal number of data sets in opposing directions are identified for further computation.

The airspeed of the aircraft is computed by the onboard processor 11 using the differential pressure sensor 4 to measure the dynamic pressure. It is understood that airspeed measurements are typically inaccurate and must be calibrated in some fashion, which can often be a laborious process. The present invention accomplishes such measurements automatically and accurately in each computation of wind speed and wind direction. A least squares mathematical approach is used to obtain calibration constants, $K_{ns}$ and $K_{ew}$, representing constants for North/South and East/West flight passes, respectively, for the airspeed as shown in the formulae:

$$K_{ns} = \frac{\sum_{}^{m}[G_n V_n + G_s V_s] - \frac{\sum_{}^{m}(G_n - G_s)\sum_{}^{m}(V_n - V_s)}{2m}}{\sum_{}^{m}[V_n^2 + V_s^2] - \frac{\left[\sum_{}^{m}(V_n - V_s)\right]^2}{2m}}$$

$$K_{ew} = \frac{\sum_{}^{p}[G_e V_e + G_w V_w] - \frac{\sum_{}^{p}(G_e - G_w)\sum_{}^{p}(V_e - V_w)}{2p}}{\sum_{}^{p}[V_e^2 + V_w^2] - \frac{\left[\sum_{}^{p}(V_e - V_w)\right]^2}{2p}}$$

Note that the above-referenced constants $K_{ns}$ and $K_{ew}$ refer to North/South and East/West flight directions, respectively. As a practical matter, these directions are examples only since the flight pairs can be in any direction and target areas may not be exactly north/south or exactly east/west. Therefore, flight pairs in the present invention do not have to follow cardinal directions. The trigonometric-based computations employed allow the pilot to fly, for example in a northeast, southwest, southeast, or northwest direction. These flight paths are still composed of opposing parallel and perpendicular groups. The computation of the present invention is based on global positioning system (GPS) bearing and will automatically rotate the answers to true north, or magnetic north, if required. Therefore, the pilot must fly two sets of relatively parallel flight passes in opposing directions, and the two sets should be near-perpendicular (90 degrees) to each other. The computation of the present invention, however, will compensate for significant error in the heading, so that even sets that are only 45 degrees apart yield good results. The wind velocity components are then obtained using the same least squares process as shown in the formulae:

$$X = \frac{\sum_{}^{m}[G_n - G_s] - K_{ns}\sum_{}^{m}(V_n - V_s)}{2m}$$

$$Y = \frac{\sum_{}^{p}[G_e - G_w] - K_{ew}\sum_{}^{p}(V_e - V_w)}{2p}$$

where X represents the wind component obtained in the direction of the first pair of flight passes and Y represents the wind component obtained in the direction of the second pair of flight passes.

In each direction, for example North/South and East/West, the bearing values are obtained and are averaged as shown in the formulae:

$$B_{na} = \frac{\sum_{}^{m} B_n}{m}$$

$$B_{ea} = \frac{\sum_{}^{p} B_e}{p}$$

where $B_n$ represents GPS bearing values obtained when flying in the northern direction, $B_e$ represents GPS bearing values obtained when flying in the eastern direction, $B_{na}$ represents the average of bearing values obtained during the first North flight pass, and $B_{ea}$ represents the average of bearing values obtained during the third East flight pass, respectively.

For pairs of flight passes that are not exactly parallel, the averaged bearings based on all four flight passes may be incorporated. From the wind velocity components and the average bearing values, the components of the wind velocity are corrected to true north and perpendicular axes as shown:

$$X_2 = \frac{X \sin B_{ea} - Y \sin B_{na}}{\sin(B_{ea} - B_{na})}$$

$$Y_2 = \frac{Y \cos B_{na} - X \cos B_{ea}}{\sin(B_{ea} - B_{na})}$$

where $X_2$ represents the True North component of wind velocity and $Y_2$ represents the True East component of wind velocity.

Finally, a conversion to polar coordinates provides the wind speed and wind direction at the lowest sequential altitude, for field application, attained during the test pattern over the field or application zone as shown:

Wind Speed:

$$M = \sqrt{(X_2)^2 + (Y_2)^2}$$

Wind Direction:

$$\theta = \arctan\left[\frac{Y_2}{X_2}\right]$$

The present invention provides an automatic and accurate calibration of the airspeed measurement, performed during each computation of wind speed and wind direction. The variables $V_n$, $V_s$, $V_e$, and $V_w$ indicate the "raw" measurements of airspeed as four flight passes in different directions are completed. These values are obtained from the same air speed sensor; thus, airspeed can be represented as a quantity, V. The calibration constants, $K_{ns}$ and $K_{ew}$, are multipliers that adjust V to a calibrated quantity. These two calibration constants can be used interchangeably since both are computed a few seconds apart under similar conditions. If these calibration constants differ in magnitude by more than about 0.1 percent, the procedure is repeated.

In another embodiment of the present invention, the value of Y described herein can be obtained via an alternative approach whereby the value of Y is obtained on a constantly updated basis, while the value of X is obtained in the same manner as described previously herein. This alternative approach will eliminate aircraft pilot effort to obtain critical parameters while spraying. This alternative embodiment determines one component of wind velocity for each pair of opposing flight passes, which is exactly what the pilot flies as the chemical is sprayed. Determination of the cross-pass component without having to always fly the near-perpendicular pair of flight passes is desirable.

In this embodiment, from each pair of spray passes a component of wind velocity, X, is obtained as well as a very accurate automatic calibration constant, $K_{ns}$, for the airspeed measurement. Once an accurate airspeed measurement is obtained, the present invention provides computation of the cross-pass component, Y, by summing movement perpendicular to the pass direction, $B_{na}$, as the pilot executes a 180 degree turn to return to the field or application zone. The summation of GPS-related movements can be viewed as movement of the aircraft shadow. The airspeed-related movements represent the action of the pilot and aircraft, which are further influenced by wind speed and wind direction. The net effect of these latter actions must be that the aircraft is above its own shadow. This logic results in the following equation for Y, the cross-pass component of wind velocity:

$$Y = \Sigma [G - K_{ns} V] \sin[B - B_{na}]$$

where G is the groundspeed obtained from GPS 17, B is the bearing obtained from GPS 17, and V is the airspeed before calibration. These quantities are obtained during the aircraft turn, therefore they have no subscript indicating direction. The quantities $K_{ns}$ and $B_{na}$ are obtained from computation of data obtained during the last pair of spray passes. The value X is also obtained in this computation, which can be grouped with the value Y for conversion to true north and east components, $X_2$ and $Y_2$, from which wind speed and wind direction are then obtained as previously noted herein. The accurate, calibrated measurement of airspeed that the present invention provides makes this approach possible. Although included in the derivation, the distance between passes does not enter into the final equation. If calibration changes during climb and glide, an accurate, calibrated measurement of airspeed is still obtained through mathematical computations and relatively automated controlled aircraft tests. Airspeed computations are actually based on heading angles rather than bearing angles so that any error over half of the aircraft turn should nearly cancel that error in the other half of the turn. Any error can be compensated for through mathematical computations via the onboard computer 12.

Atmospheric Stability

A measure of atmospheric stability is the vertical temperature gradient, which is the ratio of temperature change to a change in altitude. The temperature sensor necessary to make this measurement has been described herein. The onboard processor 11 processes the temperature signal and calculates the temperature gradient. The present invention provides the pilot with lower atmosphere stability information based on measurement of the temperature profile.

Under conditions of atmospheric stability, chemical spray drift deposits will be possibly three times as great and therefore three times more widespread than such drift deposits under unstable atmospheric conditions. Atmospheric stability is an important variable at any spray height and is important to know for mosquito applications (desiring stable conditions) and row crop or forest applications (desiring unstable conditions). Thus, the present invention provides at least one temperature sensor that measures to $\frac{1}{32}$ degree Celsius resolution. The temperature variations measured are more important than the absolute value and the time response of the temperature sensor in the present invention is fairly rapid due to the copious flow of air across the sensor itself.

Therefore, for row crop and forest applications during stable atmospheric conditions, spray drift will be a very undesirable feature. Conversely, under the same atmospheric conditions for mosquito insecticide application, controlled drift deposits are in fact desirable. If the temperature gradient is positive, the atmosphere is stable. If the temperature gradient is negative, the atmosphere is unstable. Therefore, a positive temperature gradient indicates desirable chemical spraying conditions for mosquito applications. However, a negative temperature gradient is desirable for row crop, forest, and fruit tree applications. A zero temperature gradient indicates neutral atmospheric stability or questionable chemical spraying conditions. Therefore, the temperature gradient is an important decision parameter, in addition to wind speed and wind direction, in controlling chemical spray deposits and in limiting or reducing unplanned or undesirable chemical spray drift deposits.

Angle-of-Attack

Angle-of-attack is the angle made between the centerline of an aircraft wing or the plane of a helicopter rotor and the air encountered by such wing or rotor. It is a primary factor related to stalling conditions for an aircraft and is therefore a critical safety parameter since it provides an indication of the lift reserve for the aircraft. Angle-of-attack increases as an aircraft is commanded to gain altitude, such as during the final portion of a chemical spray pass over a target area. The angle-of-attack measurement is not to be confused with the stall warning device on most modern aircraft.

Figure 3:
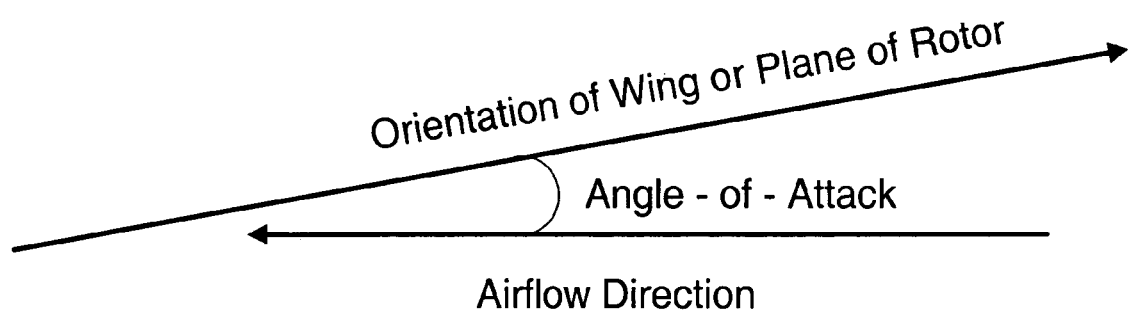
FIG. 3 is a graphical illustration of the angle-of-attack parameter in relation to the orientation of an aircraft wing, or plane of a helicopter rotor, and the airflow direction.
Figure 4:
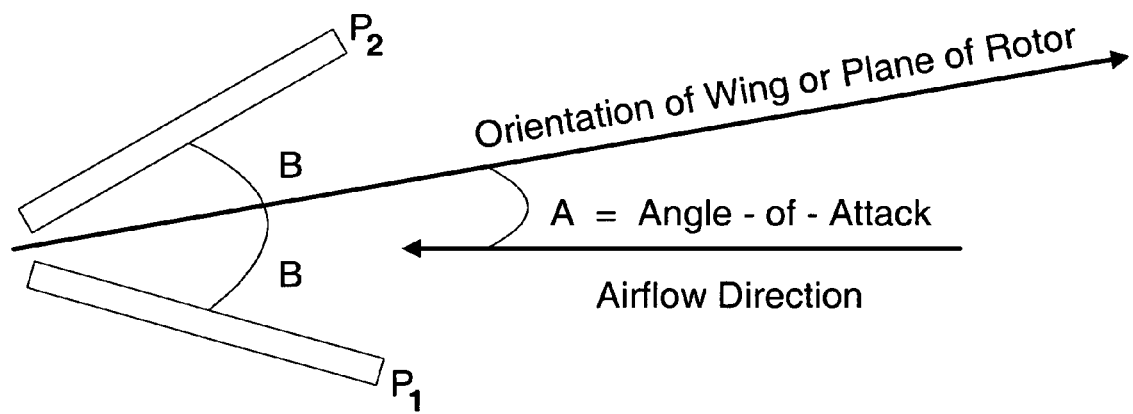
FIG. 4 is a graphical illustration of the implementation of angle-of-attack sensors showing the angle-of-attack measurement in relation to the orientation of an aircraft wing, or plane of a helicopter rotor, and the airflow direction.

In another aspect of the present invention, detection of an increase in the angle-of-attack can be used to anticipate the pull-up at the end of a chemical spray pass and effect an automatic shutoff of the spray as a backup to the pilot's manual control of the spray, thereby decreasing the likelihood of inadvertently spraying areas adjacent to the target area(s) that are not to be sprayed. It is possible to use an accelerometer, g-force sensor, altitude change sensor, or angle detection sensor to serve as a trigger for the automatic spray cutoff function. An angle-of-attack, accelerometer, or g-force sensor would be the most likely choices for the automatic spray cutoff function. Any of these types of sensors can be used as a backup to the aircraft pilot or as a primary control for the pilot. Electronic or mechanical means can be used for the automatic spray cutoff function. FIG. 3 shows the angle-of-attack parameter in relation to the orientation of an aircraft wing, or plane of a helicopter rotor, and the airflow direction. One example of the implementation of an angle-of-attack sensor is shown in FIG. 4, which illustrates the angle-of-attack measurement in relation to aircraft wing or rotor plane orientation and airflow. The implementation shown in FIG. 4 is based on the differential air pressure from two tubes, one tube measuring static and dynamic air pressure $P_1$ and pointed downward at an angle B relative to the centerline of an aircraft wing or plane of a helicopter rotor and another tube measuring static and dynamic air pressure $P_2$ and pointed upward at the same angle B relative to the centerline of the same wing or rotor plane. The tubes provide stall pressure ports 6 and 7, respectively, and require installation to the aircraft airframe, which constitutes the only other minor modification to the aircraft airframe other than the installation of the temperature sensor 10 as reference herein. The total pressure (static plus dynamic) in both tubes is equal at zero angle-of-attack. The static pressure varies with altitude but is always the same in both tubes since they are at the same altitude. As the angle-of-attack increases, however, the dynamic pressure portion of $P_1$ increases while the dynamic pressure portion of $P_2$ decreases. The air pressure difference between these two tubes, measured through a differential pressure transducer, can be divided by the measurement from the pressure transducer associated with the airspeed measurement. The angle-of-attack, A, can then be computed from the following equation:

$$A = \arctan\left[\frac{P_1 - P_2}{2P_o}\right]$$

where A represents the measured angle-of-attack, $P_0$ represents the dynamic pressure at that specific airspeed that is obtained from differential pressure sensor 4, and the difference between $P_1$ and $P_2$, which is represented by $P_1 - P_2$, represents the angled pitot pressure.

Angle-of-attack measurements and readings also provide the aircraft pilot with an indication of the lift reserve available for the aircraft for climbing by comparing the enroute angle-of-attack with that angle of attack at which the aircraft will stall. The stall angle is constant for the aircraft in any given fixed configuration and is easily determined experimentally by the aircraft pilot. This is one of the primary justifications for utilizing the angle-of-attack variable or parameter as the measurement of choice since it both provides increased safety for the pilot and allows for determination of the timing of chemical spray shutoff. However, the primary operation of interest concerning spray cutoff is to provide a cutoff mechanism that operates automatically based on detection of pull-up conditions or that the aircraft pilot may selectively control. Generally, three scenarios for spray cutoff are as follows: (1) the pilot serves as primary control and the cutoff mechanism serves as secondary control; (2) the cutoff mechanism serves as primary control and the pilot serves as secondary control; and (3) the pilot serves as the only control. The third scenario is generally that utilized by pilots currently. It is also possible to accomplish this spray cutoff task with other sensors or with no electronics involved at all in this particular function.

The above is a detailed description of particular embodiments of the present invention. All embodiments disclosed and claimed herein can be easily executed in light of this disclosure. Those of ordinary skill in the art, in light of the present disclosure, should recognize and understand that a wide variety of obvious alternatives, variations, and modifications of the embodiments disclosed herein can be selected and made without departing from the true scope and spirit of the present invention. The invention is described both generically and regarding specific embodiments, while the full scope of the invention is set out in the claims and their equivalents that follow. The disclosure and description presented further explain the invention and are not to be interpreted or inferred as limiting thereof. The claims and specification should not be construed to unduly narrow the complete scope of protection to which the present invention is entitled. The disclosure and appended claims are intended to cover all modifications that may fall within the scope of the claims.

What is claimed is:

1. A method for computing wind speed and wind direction from an aircraft, the method comprising:

means for measuring airspeed of the aircraft;

means for measuring barometric pressure;

means for determining bearing of the aircraft;

means for determining ground speed of the aircraft;

means for determining a first wind velocity component in the direction of a first pair of flight passes;

means for determining a second wind velocity component in the direction of a second pair of flight passes;

means for correcting a wind velocity component to true north and perpendicular axis; and processing means for computing wind speed and wind direction.

2. The method according to claim 1, wherein the aircraft delivers chemicals to an application zone.

3. The method according to claim 2, wherein the application zone comprises a target area selected from a group consisting of a row crop field, forest, fruit tree orchard, urban area, non-urban area, non-row crop area, pasture, swamp, and marsh.

4. The method according to claim 1, wherein the means for measuring airspeed comprises:

a pitot tube including a port for measuring static and dynamic air pressure;

a static port included on said pitot tube for measuring static air pressure only;

a first differential pressure transducer including a sensor for measuring dynamic pressure; and a barometric pressure sensor.

5. The method according to claim 1, wherein the means for determining bearing of the aircraft comprises a global positioning system.

6. The method according to claim 1, wherein the means for determining ground speed of the aircraft comprises a global positioning system.

7. The method according to claim 1, wherein the processing means for computing wind speed and wind direction comprises:

means for recording wind speed and wind direction at flight height;

at least one analog to digital converter;

an onboard processor; and an onboard computer.

8. The method according to claim 1, wherein the processing means for computing wind speed and wind direction further comprises:

at least one illuminated switch for visual annunciation of status of functions;

a touch screen; and a voice playback module for receiving signals for audio playback and providing audio playback signals to the aircraft audio system.

9. The method according to claim 7, wherein the onboard processor comprises an application specific integrated circuit (ASIC), a microcontroller, a computer system, a processor, a microprocessor, a digital signal processor (DSP), or combinations thereof.

10. The method according to claim 7, wherein the onboard computer comprises a processor, microprocessor, or combination thereof.

* * * * *